United States Patent
Islam et al.

(10) Patent No.: US 6,937,295 B2
(45) Date of Patent: Aug. 30, 2005

(54) REALISTIC REPLICATION OF A LIVE PERFORMANCE AT REMOTE LOCATIONS

(76) Inventors: Junaid Islam, 2341 Cottle Ave., San Jose, CA (US) 95125; Don Mischer, 9575 Hidden Valley Rd., Beverly Hills, CA (US) 90210; Charlie Haykel, 1667 Bridgegate St., Westlake Village, CA (US) 91361

( * ) Notice: Subject to any disclaimer, the term of this patent is extended or adjusted under 35 U.S.C. 154(b) by 366 days.

(21) Appl. No.: 10/141,046

(22) Filed: May 7, 2002

(65) Prior Publication Data

US 2004/0032536 A1 Feb. 19, 2004

Related U.S. Application Data

(60) Provisional application No. 60/289,446, filed on May 7, 2001.

(51) Int. Cl.[7] .......................... H04N 5/222; H04N 7/18; H04N 9/47

(52) U.S. Cl. ........................................ 348/722; 348/143
(58) Field of Search ................................. 348/722, 578, 348/143; 725/71, 70, 78, 81; 472/59, 28, 65, 75; H04N 5/222, 7/18, 9/47, 9/74

(56) References Cited

U.S. PATENT DOCUMENTS 5,790,124 A * 8/1998 Fischer et al. ................ 472/75
6,353,461 B1 * 3/2002 Shore et al. ................ 348/722
6,848,219 B2 * 2/2005 Standard et al. ............. 472/75

* cited by examiner

Primary Examiner—Sherrie Hsia
(74) Attorney, Agent, or Firm—Joe Zheng

(57) ABSTRACT

Systems and methods for realistic, real-time recreations of live events are described. One or more virtual stages, equipped with assorted live-event reproductions media, receive a real-time feed from a live event. This produces an audio-visual experience which is nearly indistinguishable from the live event for specially situated attendees.

22 Claims, 3 Drawing Sheets

REALISTIC REPLICATION OF A LIVE PERFORMANCE AT REMOTE LOCATIONS

CLAIM OF PRIORITY

This application claims priority to U.S. Provional Application No.: 60/289,446, filed May 7, 2001, entitled "Realistic Replication of a Live Performance at Remote Locations, " Inventors Charles Haykel, Donald L. Mischer, Junaid Islam, which is hereby incorporated by reference in its entirety.

BACKGROUND OF THE INVENTION

1. Field of the Invention

This invention relates to the field of broadband multimedia transmissions. In particular, the invention relates to broadband transmission of multimedia data to replicate live performances.

2. Description of the Related Art

The long history of multimedia technologies includes countless developments that support the transmission or rebroadcast of live events, such as radio, television, network-based multicasting, and video recording. However, these efforts have not been designed to recreate live events in a realistic manner, wherein the replicated event creates the illusion of the live event. Closed circuit television does allow multiple users at a remote site to witness a live event, such as a boxing match. However, no attempt is made to recreate the live event, such as the boxing match, in a realistic manner—i.e., one that creates the illusion of a live event—at the remote sites. State of the art virtual reality technologies are inadequate to convert the sights and sounds of a live event into a convincing virtual experience, particularly in real-time.

As such, it would be desirable to employ a technology that can realistically recreate live performances, such as concerts, speeches, and other events. It would be desirable to recreate these events in remote locations in real time, so that observers at the remote sites would have the experience of attending the live event. These desired technologies are among the objectives of the present invention.

SUMMARY OF THE INVENTION

The invention enables live performances conducted on a first stage, or "live stage," to be reproduced realistically at one or more "virtual stages" which may be remote from the live stage. The live stage and virtual stages are specifically designed to create a convincing illusion of the live event at the virtual stages. In embodiments of the invention, the live stage is coupled to the virtual stages via one or more broadband media, which allow the performance to be replicated at the virtual stages in real time. These broadband media may include satellite transponders, optical fiber networks, a local area network, an internetwork, or a publicly switched telephone network. In some such embodiments, the live stage may communicate to the virtual stage by use of protocols such as DBS, TCP/IP, ATM, or ISDN. In alternative embodiments, the performance may be taped at the live stage onto one or more storage media, to be replayed at the one or more virtual sites on demand.

Embodiments of the invention include a high definition camera and a high definition audio recording system at the live stage. Signals from the camera and audio recording system may be reproduced on high definition projectors and surround sound audio systems which are specifically configured at the virtual stages to enhance the illusion of a live event. In some embodiments of the invention, contact mikes are embedded in the live stage to record ambient noise which is reproduced at the virtual stages. In embodiments of the invention, a lighting board at the live stage controls lighting trusses at the live stage as well as the virtual stages, in order to duplicate the lighting effects of the live performance at the virtual stages. In some such embodiments, the lighting board may communicate with the lighting trusses by use of a protocol such as PBX. The lighting, audio, and visual data received at the live stage may be coupled into a continuous data stream, which may be deciphered and replayed at the virtual stages. In some embodiments of the invention, the continuous data stream may be encoded in MPEG format. These and other embodiments of the invention are more particularly described herein.

DETAILED DESCRIPTION

A. System Overview

The invention comprises a system, method, and apparatus for replicating a live performance. In particular, the invention enables a live performance conducted on a first stage, or "live stage" to be replicated at one or more "virtual stages", which may be remote from the live stage. The invention creates an illusion at the virtual stages that the performances are taking place live, on location; the live stage and virtual stages are specifically designed to duplicate the live performance at the virtual stages in a manner which creates an illusion of a live performance.

Figure 1:
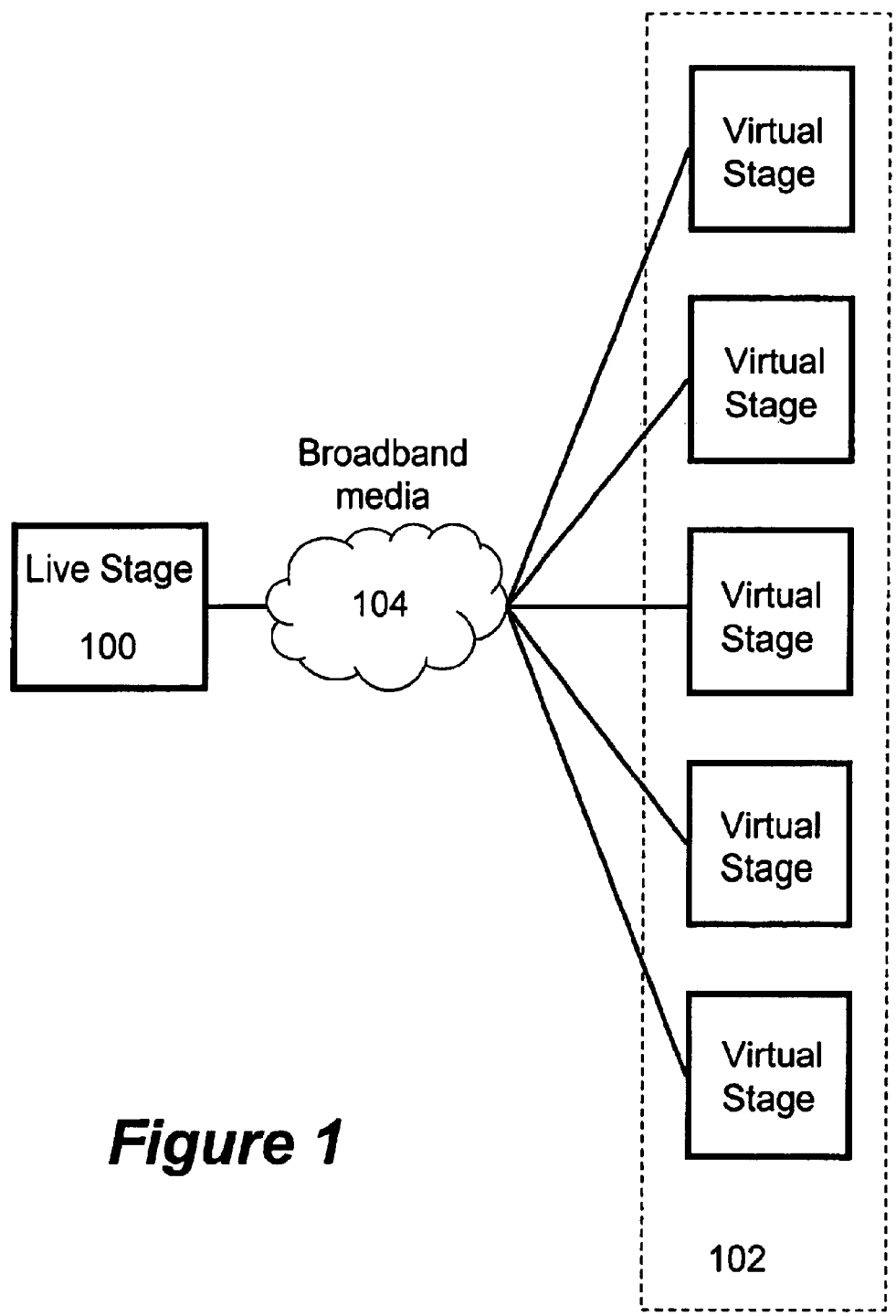
FIG. 1 illustrates a link between a live stage and one or more virtual stages according to embodiments of the present invention.

System architectures employed by embodiments of the invention are illustrated in FIG. 1. A performance occurs at customized live stage 100 under constraints that support replication of the performance at one or more virtual stages 102, wherein the one or more virtual stages 102 are specifically designed to create a realistic replication of the performance. In embodiments of the invention, the live stage 100 is coupled to the virtual stages 102 via one or more broadband media 104, which allows the performance to be replicated at the virtual stages 102 in real time. In alternative embodiments, the performance may be taped at the live stage 100 to be replayed at the one or more virtual sites 102. Embodiments of the invention are described in greater detail herein.

B. The Live Stage

The live stage 100 includes design features that facilitate realistic replication at the virtual stages 102. These features include the dimensions of the virtual stage 102, the types of cameras and lenses utilized to record the performance, the relative location of cameras and performers, the types of mikes placed on the stage, and the lighting used on the stage. Embodiments of the live stage 100 are depicted in FIG. 2 and described below.

Dimensions of the Live Stage

Figure 2:
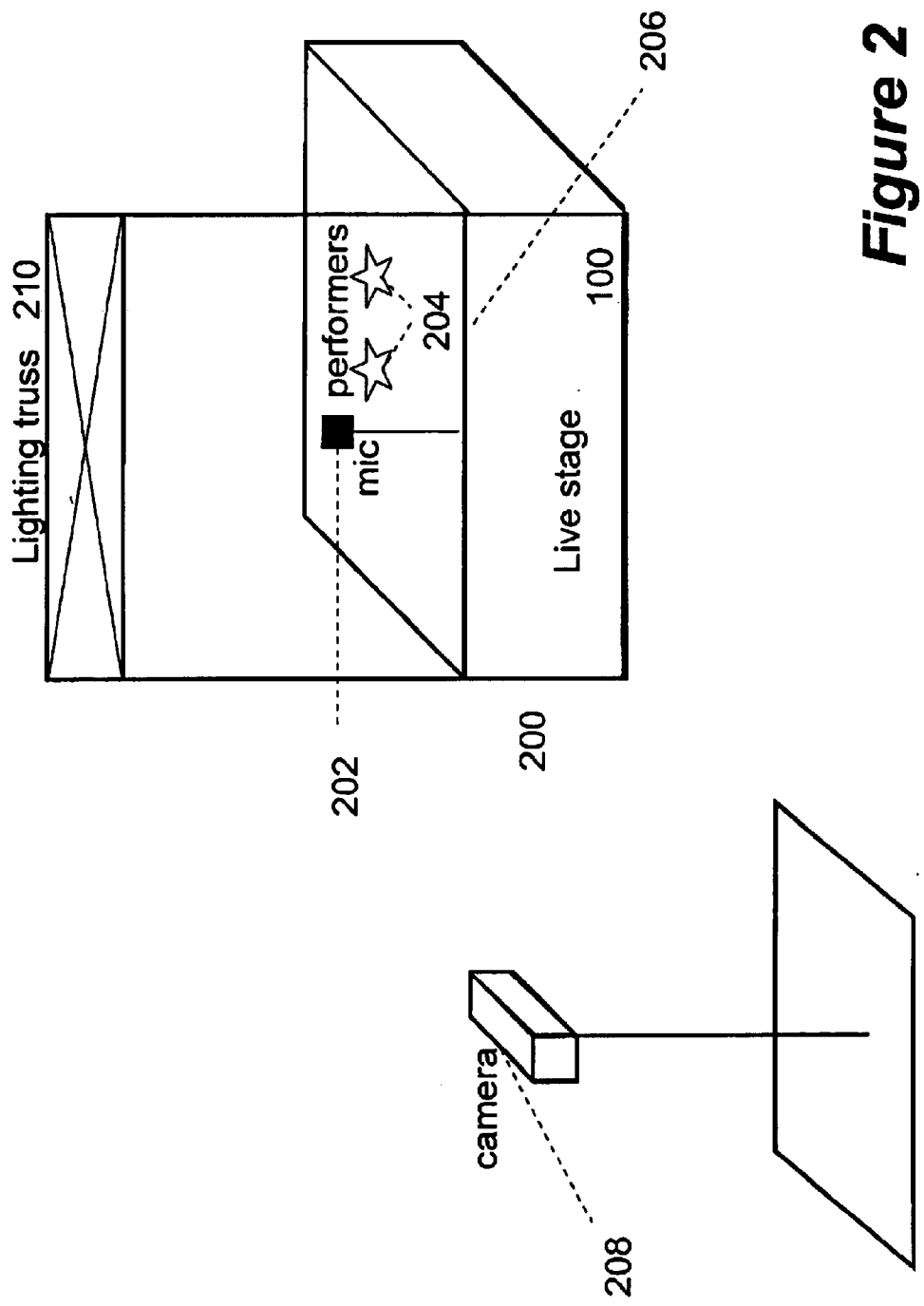
FIG. 2 illustrates a live stage configured according to an embodiment of the invention.

The live stage 100, as depicted in FIG. 2. is customized to facilitate realistic reproduction of performance conducted on the live stage. In a non-limiting example of the invention, the particular dimensions of the live stage 100 include a height 200 of four feet, and a microphone 202 placed on the stage at a height of 4 feet 11 inches. In this example, performers 204 on the stage are situated at a distance on or about 2 feet 3 inches from the downstage lip 206 of the live stage 100.

Cameras Used at the Live Stage

Embodiments of the invention utilize a single high definition camera 208. As a non-limiting example, the system may employ a Sony HDW-700/1080™. The camera may be set at SEMPTE 240m and preset 3200 white balance. Other settings which aid in realistic replication will be apparent to those skilled in the art.

Alternative high definition cameras that may be used at the live stage include a Sony HDC™ 750 or 950. The 950 is capable of 24p, which mimics 35 mm film. This camera allows full camera control unit (CCU) control. A serial digital output may also be obtained from this set-up. Other alternative cameras that may be utilized to record performances at the live stage will be apparent to those skilled in the art. In embodiments of the invention, the camera is aligned on the live stage 100 so that the feet of one or more performers 204 on the stage 100 will appear at the bottom of a frame.

Lenses Used in the Camera

Embodiments of the invention utilize a high definition camera lens within the camera 208. In a non-limiting example, the camera may include a Fujinon High Definition Cine Lens™. Model #'s that may be used include:

12 mm, HAF12B-10

20 mm, HAF20B-10

5–50 mm zoom, HA10x5B-10.

Example measurements for each of the example lenses above are listed in Table 1 below:

TABLE 1

| Lens | Lens Height | Focal Length from Chip to performer | F-Stop | Key |
|---|---|---|---|---|
| 12 mm-Prime | 65" | 19'1" | 4 | 65 FC |
| 20 mm-Prime | 63" | 32' | 4 | 70 FC |
| 20 mm–25 mm-zoom | 64.5" | 38'6" | 4 + little | 68–70 FC |

Audio and Lighting

Embodiments of the invention include a recording system used to generate a high definition audio signal. One example of a high definition audio recording system that may be employed in the invention is the Dolby 5.1™. This system includes 5 audio channels and a subwoofer. Other high definition or surround-sound audio systems adequate for realistic replication at the virtual stages 102 will be apparent to those skilled in the art. In embodiments of the invention, contact mikes are embedded in the floor of the performance stage 100 in order to sense ambient noise—this ambient noise is detected for rebroadcast at the virtual stage 102, in order to enhance the realism of the replicated performance.

In embodiments of the invention, a lighting truss 210 is controlled by a single lighting board at the live stage utilizing a DMX protocol. This DMX protocol is also used to direct a lighting board at the virtual stages 102, in order to replicate the lighting at the live stage 100. The replication of the lighting effects is also described later in this specification.

C. The Virtual Stages

Figure 3:
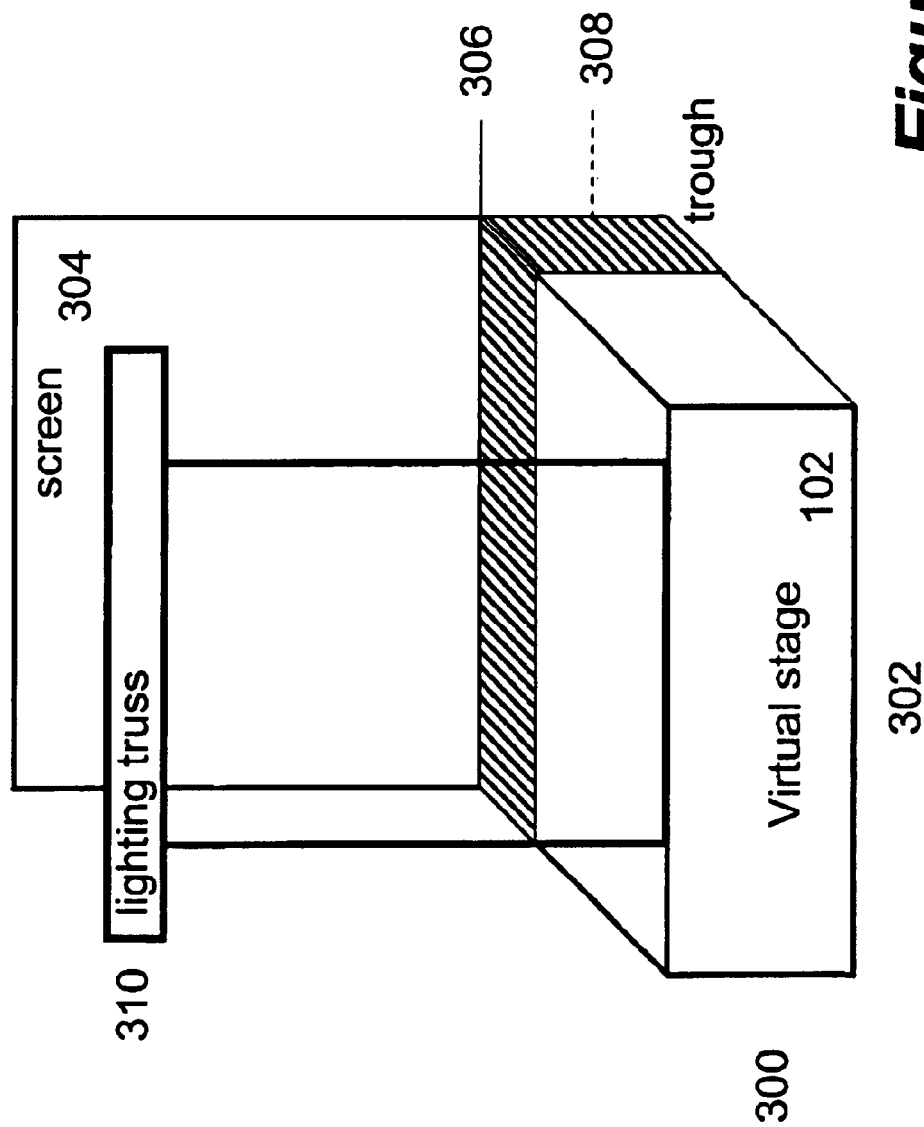
FIG. 3 illustrates a virtual stage configured according to an embodiment of the invention.

The one or more virtual stages 102 of the present invention are illustrated in FIG. 3. Signal features of the virtual stage 102 are described herein.

Dimensions of the Virtual Stage

In embodiments of the invention, the virtual stage 102 is two feet high 300 by sixteen feet wide 302. A projection screen 304 is at the rear 306 of the virtual stage 102. Embodiments of the invention include a trough 308 between the stage 102 and the screen 304 to minimize any spill light from a downstage lighting truss 310 onto the screen 304.

Projection System

The projection system included in the virtual stage is designed to project a high definition signal with sufficient resolution to create an illusion of a live performance at a distance of 20 feet or greater from the projection screen 304. The projection system used in the invention include suitable projectors, projection screens, projector input, and projection lenses for generating a realistic effect, as described infra:

Projector

Embodiments of the invention may utilize a high definition projector, such as a DLP AHD-5SX ™. In some embodiments, this projector is specifically configured from a stock 5SX model to have greater contrast ratios. The DLP AHD-5SX produces a 1024×1280 image. In alternative embodiments, the projector may include a higher resolution chip which supports true High Definition and a 1024×1340 image.

Projector Input

In embodiments of the invention, the Projector Input may comprise a component analog High Definition signal. In some embodiments, the Projector Input comprises a Serial Digital High Definition input.

Projection Lens

In embodiments of the invention, the project includes a projection lens with a 1.5:1 prime (non-anamorphic); this results in a throw distance from the lens to the screen of 24 feet, to produce an image 16 in width. In alternative embodiments, the invention may utilize an anamorphic lens, which will increase the resolution vs. the non-anamorphic. Alternative embodiments may also utilize a 1:1 lens to reduce the throw distance needed to 16 feet.

In an embodiment of the invention, in order to further reduce the amount of throw distance, a mirror may be utilized to reflect the image. In some such embodiments, this mirror may comprise a $1^{st}$ surface glass mirror in an 8'×8' size. This mirror may decrease the throw distance by four to six feet, due to trapizoiding. Thus, the lens therefore would be 10 feet or more from the screen, as opposed to the 16 feet distance in embodiments using a 1:1 lens and no mirror.

Projection Screen

The projection screen 304 is suitable for high resolution display. Embodiments of the invention employ a DA LITE 16'×9' rear projection screen at 1:1 gain. Alternative embodiments may utilize a Stewart Areo View 100™, which is also 1:1 and a light white color. Other alternative projection systems with suitably high resolution will be apparent to those skilled in the art.

Audio Replay

The high definition audio signal recorded at the live stage is replayed at the one or more virtual sites using a complementary high definition audio replay system. In embodiments of the invention, the high definition audio replay system comprises a Dolby Surround Sound™, including five channels and a subwoofer. Alternative high definition audio systems will be apparent to those skilled in the art.

Lighting at the Virtual Stages

In embodiments of the invention, the lighting truss 310 at the virtual stage 102 is controlled by the lighting board at the live stage 100, in order to replicate the lighting effects at the live and virtual stages. The replication of lighting effects contributes to the realistic replication of the projected broadcast performance at the virtual stage. In embodiments of the invention, lighting boards at the live and virtual stages are controlled by identical commands. In an embodiment, these commands are encoded in a PBX protocol. Other equivalent protocols will be apparent to those skilled in the art.

D. Data Links

The various digital and audio data detected at the live stage may be converted into a digital multimedia file, which may be broadcast to the one or more virtual stages as a live multimedia stream, or alternatively recorded for replay at the one or more virtual stages. In embodiments of the invention supporting real time broadcast of the multimedia stream, the live stage 100 and one or more virtual stages 102 are linked by at least one broadband data connection 104. In some embodiments, the broadband data connection 104 is two-way. In other embodiments, the broadband connection allows the live stream to be sent from the live stage to the one or more virtual stages, while feedback is provided from the virtual stages to the live stage by one or more additional links. By supporting bilateral communication between the live stage 100 and one or more virtual stages 102, the invention allows interactivity between performers on the live stage and participants on the one or more virtual stages.

In an embodiment of the invention, the live stage 100 is coupled to each of the one or more virtual stages 102 by a broadband data link 104. In one embodiment, the live stage 100 communicates to a remote stage 102 by use of two or more transponders on a Digital Broadcast Satellite (DBS). In embodiments, the live stream sent via the DBS is encoded as an MPEG stream. In some such embodiments, the MPEG stream includes a field for encoding DBX signals from the lighting board at the live site. This allows the lighting truss 310 at the remote stage 102 to be controlled by the lighting board for the live stage 100, so that lighting effects at the two stages are replicated. In some such embodiments, the remote site is coupled to the live site via a second link, such as, but not limited to, an ISDN link.

In other embodiments, the live stage and one or more remote stages are linked by a broadband link such as an ATM network. In some such embodiments, the live stream is encoded in MPEG and sent over IP on the ATM network. Other suitable data connections will be apparent to those skilled in the art.

E. Peformance of the Technology

The embodiments of the invention described above have been shown in implementation to recreate the live event in the virtual stages with a convincing illusion of reality at distances of 20 feet or greater from the projection screen and at an angle within 30 degrees from the projection screen.

F. Applications of the Technology

The invention as described above may be utilized in a number of applications, including:

Live Seminars

The invention allows seminars conducted at the live stage to be broadcast to remote live stages. For example, a speaker at the live stage may conduct an interactive seminar with participants at the one or more remote stages.

Live Broadcast of Concerts

Concerts performed at the live stage 100 may be shown to viewers at the one or more remote stages 102. The remote stages may be located at clubs in rural or underserved areas, thereby allowing headlining artists to be seen in concert at multiple geographically diverse sites at which they would not ordinarily perform. The inclusion of ambient noise from the live stage in the live transmission, or stream, enhances the realism of the concert of the remote site. Data links 104 feeding from the remote virtual stages to the live stage provide the performers on the live stage 100 with feedback from the audience at the remote stages 102, thereby mimicking the interactivity of a live concert.

Sporting Events

Live sporting events conducted on a live stage may be broadcast to one or more remote virtual stages. The sporting event is conducted on the live stage within parameters which allow realistic rebroadcast at the virtual stages. Non-limiting examples of suitable sporting events include gaming events, such as card or dice games or chess matches. Other sporting events that may be broadcast live remote virtual stages according to embodiments of the invention include boxing or bowling. Other examples will be apparent to those skilled in the art.

Corporate Meetings

The invention may be utilized to support interactive corporate meetings. For instance, the system may be employed for shareholder meetings, wherein the attendees are located at multiple remote virtual sites. The invention may also be utilized for any other type of intra or inter corporate meetings, as will be apparent to those skilled in the art.

Live Theater

The invention may be utilized to display live theater conducted on the live stage to one or more remote virtual stages. The features of the invention enhancing realism, including the ambient noise included in the live transmission, enhance the experience for the viewers at the remote sites, allowing audiences at the remote sites to enjoy an experience that very closely resembles that of the audience at the live stage.

On-Demand "Live" Entertainment

The invention also allows realistic events to be time delayed. For instance, a live performance at the live stage may be recorded according to embodiments of the invention, for later, on demand replay. This allows viewers to experience realistic live events on demand, at a time chosen by them. Thus viewers are no longer constrained by the timings of a live event to enjoy a realistic experience of the event.

G. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. A system for realistically replicating a live performance conducted at a first geographical location to a second geographical location, wherein the live performance is conducted on a first stage located at the first geographical location, and the second geographical location includes a second stage, wherein the second stage is configured to resemble the first stage and the second stage used for replaying the live performance, the system comprising:

a high definition camera at the first geographical location, wherein the high definition camera is positioned at a fixed location relative to the first stage to receive a continuous visual stream of the live performance;

one or more contact mikes embedded in the first stage and placed to receive a stream of ambient noise from the live performance in real-time;

one or more stage mikes located on or about the first stage and placed to receive a multi-channel high definition audio signal from the live performance;

a first plurality of lights on a first lighting truss located on the first stage, the one or more lights directed at the live performance;

a lighting control board located at the first stage, wherein the lighting control board is in communication with the first plurality of lights via a lighting protocol, such that the lighting control board controls the first plurality of lights via the lighting protocol;

one or more broadband data links coupling the first geographical location to the second geographical location;

a high definition screen located behind the second stage, the high definition screen coupled to the one or more broadband data links, such that the high definition screen receives the continuous visual stream via the one or more broadband data links and replays the continuous visual stream;

a second lighting truss on the second stage, the second lighting truss in communication with the lighting control board via the one or more broadband data links, wherein a second plurality of lights on the second lighting truss is controlled by the lighting control board via the lighting protocol received from the lighting control board via the one or more broadband data links;

a plurality of speakers located at the second stage and in communication with the one or more broadband data links, wherein the plurality of speakers receives and replays the multichannel high definition audio signal and the stream of ambient noise via the broadband data links.

2. The system of claim 1, wherein the second stage includes a trough the high definition screen and the second stage, the second stage configured to collect spill light from the second lighting truss.

3. The system of claim 1, wherein one or more performers are at the first stage, such that the one or more performers are captured in the continuous visual stream.

4. The system of claim 3, wherein the one or more performers, wherein the one or more performers are within a predetermined distance from a front of the first stage.

5. The system of claim 4, wherein the predetermined distance is on or about two feet from the front of the first stage.

6. The system of claim 1, wherein the multichannel high definition audio signal includes five channels and a subwoofer.

7. The system of claim 1, wherein the lighting protocol is subliminally embedded as a field in the continuous visual stream.

8. The system of claim 1, wherein the performance comprises a live theater performance.

9. The system of claim 1, wherein the performance comprises a live concert.

10. The system of claim 1, wherein the performance comprises a speech.

11. A method of realistically recreating a live performance, the live performance conducted on first stage and replayed on a second stage, wherein the second stage is configured to resemble the first stage, distinct from the first stage, the method comprising:

generating lighting commands from a control board at the first stage;

sending the lighting commands from the control board to a first lighting truss, the first lighting truss located at a front of the first stage;

receiving a high definition audio signal from the first stage, the high definition audio signal including ambient noise from the live performance;

receiving a high definition visual signal from the live performance at the first stage;

coupling the lighting commands, high definition audio signal, and high definition video signal into a continuous data stream, such that the lighting commands, high definition audio signal, and high definition video signal are synchronized in the continuous data stream;

reproducing the continuous data stream at the second stage, the reproducing of the continuous data stream including:

operating a second lighting truss located at a front of the second stage in response to the lighting commands, projecting the high definition video signal on a high definition screen located at a rear of the second stage, and replaying the high definition audio signal at the second stage such that the reproduced continuous data stream at the second stage is nearly indistinguishable from the live performance from a distance from the front of the second stage.

12. The method of claim 11, wherein the first stage and second stage are at different geographical locations.

13. The method of claim 12, wherein the first stage and second stage are in communication via one or more broadband media.

14. The method of claim 13, wherein the continuous data stream is sent to the second stage from the first stage via the one or more broadband media.

15. The method of claim 14, wherein the continuous data stream is reproduced at the second stage concurrently with the performance.

16. The method of claim 15, wherein the one or more broadband media include a satellite network.

17. The method of claim 15, wherein the one or more broadband media include a fiber optic network.

18. The method of claim 11, further comprising:

prior to reproducing the continuous data stream, recording the continuous data stream on a storage medium.

19. The method of claim 18, wherein the reproducing the continuous data stream includes deciphering the continuous data stream at the second stage via the storage medium.

20. The method of claim 19, wherein the deciphering the continuous data stream is done after a conclusion of the live performance.

21. The method of claim 20, wherein the storage medium is a hard drive coupled to a broadband medium in communication with the second stage.

22. The method of claim 20, wherein the storage medium is a video tape.

* * * * *